Jan. 15, 1957  A. E. MURRAY  2,777,364
FOCUSING LENS FOR OPHTHALMIC INSTRUMENT
Filed Jan. 16, 1956
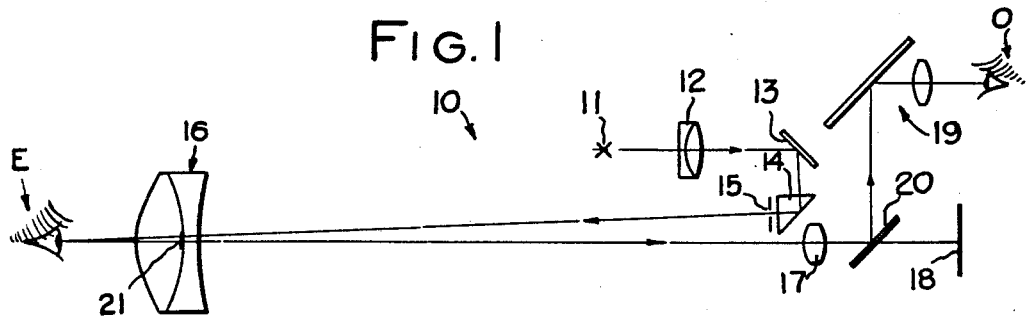
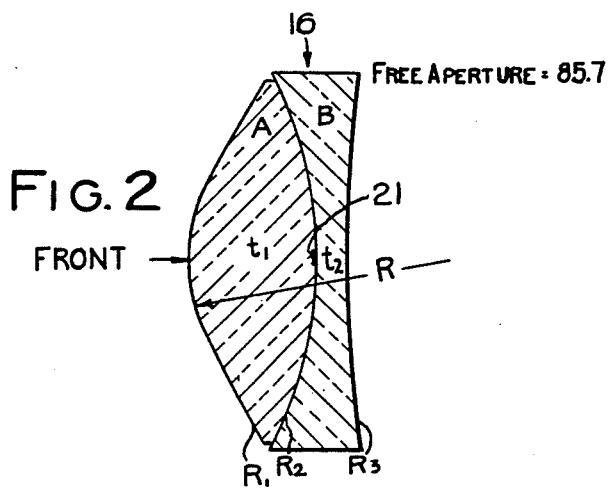
FIG. 3
| E.F. = 100 | | B.F. = 68.47 | F.A. = 36° | |
|---|---|---|---|---|
| LENS | RADII | THICKNESS | nD | ν |
| A | R₁ = 64.29 ASPHERIC<br>R₂ = -58.14 | t₁ = 34.43 | 1.6968 | 56.1 |
| B | R₃ = 393.29 | t₂ = 14.29 | 1.6725 | 32.2 |
INVENTOR.
ALLEN E. MURRAY
BY
*G. A. Ellestad*
ATTORNEY United States Patent Office 2,777,364
Patented Jan. 15, 1957

2,777,364

FOCUSING LENS FOR OPHTHALMIC INSTRUMENT

Allen E. Murray, Rochester, N. Y., assignor to Bausch & Lomb Optical Company, Rochester, N. Y., a corporation of New York Application January 16, 1956, Serial No. 559,463

2 Claims. (Cl. 88—57)

This invention relates to ophthalmic instruments such as ophthalmoscopes, retinal cameras and the like, and more particularly it relates to improvements in the principal lens by which the eye of a patient is observed or photographed and through which illumination is directed into said eye.

In the development of modern ophthalmic instruments of this kind, efforts have been made to meet the more exacting demands of the medical profession. Because of the uncritical requirements of prior art instruments of this kind, lenses were used having spherical and chromatic aberrations which are now intolerable when judged by modern standards.

Efforts to improve the optical systems of retinal cameras and the like depend almost entirely on perfecting its principal lens which has a two-fold duty, i. e., of acting as a condenser for the light rays that illuminate the retina of the eye and of forming an image of the retina for photographic or observational purposes. It happens that the optical conditions for improving the principal lens when acting as a condenser are not compatible with the optical conditions and requirements for improving the lens when acting as a photographic "taking" lens and therefore a difficult problem is encountered in achieving substantial improvement. The problem of preventing unwanted reflections and glare spots in the image dictates that the optical form of the lens shall involve a minimum number of refractive surfaces as noted in the prior art U. S. Patent 1,764,870, issued to H. Hartinger on June 17, 1930.

It is an object of this invention to provide an improved principal lens for ophthalmic examination instruments such as ophthalmoscopes and retinal cameras wherein the image quality produced by said lens is of a high order, the aberrations thereof being substantially fully corrected, particularly as regards spherical and chromatic aberrations, and coincidentally all undesired reflections from the light source are effectively masked out of the field of view.

Further objects and advantages will be apparent in the various features described in the specification herebelow and shown in the accompanying drawing in which:

Fig. 1 is a schematic view of an ophthalmic instrument embodying my invention,

Fig. 2 is a mid-sectional view of a principal lens shown also in Fig. 1, and

Fig. 3 is a chart giving constructional data for said lens.

A preferred form of my invention is shown in Fig. 1 of the drawing embodied in a retinal camera 10 comprising a light source 11 which is focused by a field lens 12 upon the pupil of an eye E to be examined. In this instrument the light from the source 11 is directed by a mirror 13 and a prism 14 through an appropriate slit mechanism 15 and from thence is projected through a principal lens 16 upon said pupil. Light rays reflected from the eye of the patient travel back through said principal lens 16 in a direction diverted from the direction of the illuminating rays and are focused by a collective lens 17 upon an imaging surface 18. Said surface 18 may be a sensitized photographic plate or a screen on which the image may be seen by the observer's eye O by the use of a suitable ocular generally designated by the numeral 19, used in conjunction with a half-silvered mirror 20.

According to this invention, the principal lens 16 is greatly improved in optical quality with regard particularly to three of its functions, even though the conditions for simultaneous improvement of these three functions are mutually incompatible with each other. The three functions are: first, refraction of light rays that proceed through the lens from rear to front so as to act as a good light condenser in illuminating the retina of the eye; second, refraction of image rays proceeding through the lens from front to back so as to form a good image of said retina; and third, refraction of the light rays so that all objectionable reflections of the light source in the field of view that are produced by the refracting surfaces $R_1$ and $R_2$ may be masked out by a central opaque mask of optimum size.

In order to improve the three lens functions simultaneously, the principal lens 16 is composed of a front element A of biconvex form and a rear element B of biconcave form cemented thereto whereby the fewest possible refractive and reflective surfaces are provided for producing good imaging and condensing qualities in view of the fact that these same surfaces also produce undesirable bright ghosts in the field of view. It has been found that in a lens of this kind in which the equivalent focal length is 100 mm. and the back focus is 68.47 mm., the front refractive lens surface $R_1$ should have an aspheric curvature in which the vertex radius $R$ is between 58 mm. and 70 mm. and the outer zones of the curve are defined by the mathematical expression $x = ay^2 + by^4 + cy^6 + dy^8 + ey^{10}$. The interface curvature $R_2$ is spherical and acts dispersively with respect to rays entering the front of the lens, the range of values for the radius of curvature $R_2$ being given by the expression 52 mm. $< R_2 <$ 64 mm. The curvature of the rear surface $R_3$ is spherical and acts collectively and the range of values therefor is from $3.9 \times 10^2$ mm. to $3.93 \times 10^5$ mm. The range of values for the radius of curvature of the lens surface $R_3$ is chosen such that the oblique cone of light that is reflected from said surface is not incident on any part of the lens 17. This result may be secured within the specified range of radii from $3.9 \times 10^2$ mm. to $3.93 \times 10^5$ mm. wherein the radius of curvature $R_3$ must be chosen so as to form a real image of the light source 11 near an optimum position which is close to and rearwardly of the lens 17. If $R_3$ surface is too flat, the reflected ghost image will be enlarged so much that its light will enter the lens 17 and if the curvature of $R_3$ is too deep, the ghost image will be formed too far forwardly so that the cone of light rearwardly of the image will encroach on lens 17. The axial thicknesses of the lens elements $t_1$ and $t_2$ fall between 29 mm. to 40 mm. and 12.5 mm. to 16 mm., respectively. The ratio of the refractive indices $n_D(A)/n_D(B)$ of lens elements A and B lies within the range between 1.091 and 1.009, and the difference between their respective $\nu$ values lies within the range of values $\nu_{(A)} - \nu_{(B)}$ is between 21.9 and 25.9. In the preferred form shown in Figs. 2 and 3, the lens elements A and B are constructed according to the following data in which $R_1$, $R_2$ and $R_3$ are refractive surface curvatures, $t_1$ and $t_2$ are axial thicknesses, $n_D$ are refractive indices and $\nu$ are the Abbe numbers or relative reciprocal dispersions of the glasses.

[E. F. = 100 mm. B. F. = 68.47 mm. Clear aperture = 85.7 mm. Field angle = 36°.]

| Lens | Radii | Thickness, mm. | $n_D$ | $\nu$ |
|---|---|---|---|---|
| A | Vertex radius R = 64.29 mm. Aspheric curvature of outer zones of $R^1$ is specified by mathematical expression $x = ay^2 + by^4 + cy^6 + dy^8 + ey^{10}$ | $t_1 = 34.43$ | 1.6968 | 56.1 |
| B | $R_2 = -58.14$ mm. $R_3 = 393.29$ mm. | $t_2 = 14.29$ | 1.6725 | 32.2 |

The numerical values of the various coefficients in the above formula for the value of $x$ should be within the range of values given below:

$a = 8.5559 \times 10^{-3}$ to $7.000 \times 10^{-3}$ inclusive
$b = 7.7608 \times 10^{-7}$ to $7.0216 \times 10^{-7}$ inclusive
$c = 1.4921 \times 10^{-10}$ to $1.2711 \times 10^{-10}$ inclusive
$d = 3.5136 \times 10^{-14}$ to $1.8920 \times 10^{-14}$ inclusive
$e = 2.847 \times 10^{-17}$ to $1.533 \times 10^{-17}$ inclusive.

Using the above data, a principal lens 16 may be constructed in which its spherical and chromatic aberrations are substantially completely corrected with regard to light rays passing therethrough from either the front or the rear thereof.

The refractive surface curvatures, whose radii are $R_1$, $R_2$, $R_3$, are furthermore so chosen that the ghost or reflected image of the slit 15 is formed centrally at the interface $R_2$ whereat an opaque mask 21 of 2.2 mm. diameter is formed by suitable opaque materials so that said image is occluded thereby. The slit image or ghost formed by the second refractive surface $R_2$ is located at a distance of approximately ¼ $t_1$ from the apex of surface $R_1$ so it also is occluded by the mask 21. The surface $R_3$ forms an image of the slit 15 far to the rear of the imaging surface 18 so that it is not seen in the field of view.

The beneficial elimination of chromatic aberration is secured by the use of glasses having a difference in their relative reciprocal dispersions or Abbe numbers of from 21.9 to 25.9 and a corresponding ratio of refractive indices for the D line of the spectrum of from 1.091 to 1.009, the optimum values in each case being 23.9 for said difference and 1.0146 for said ratio. Along with the great success achieved in correcting spherical and chromatic aberrations, pure coma and sine condition coma are reduced to tolerable amounts.

From the foregoing specification, it will be apparent that this invention provides an improved principal lens for the purpose stated, said lens having substantially no spherical and chromatic aberrations when used as either a condensing lens or an imaging lens and wherein all ghost reflections are effectively masked out of the field of view in conformity with the stated objects of this invention. Although only one preferred form of this invention has been shown and described in detail, other forms are possible and changes and substitutions may be made therein without departing from the spirit of this invention as defined in the appended claims.

I claim:

1. In an ophthalmic examination device, a projection lens by which an illuminated slit is focused upon the pupil of an eye to be examined and by which the light that is reflected from said eye is focused at an image plane located rearwardly of said lens and said slit, said lens being corrected for spherical and chromatic aberrations, sine condition and coma and comprising a front double convex element and a rear double concave element, the adjacent surfaces of the elements being cemented together, and an opaque mask having a diameter that is substantially .022 times the equivalent focal length of the lens and is located centrally on an interface between said front and rear elements so that reflections of light from the successive refractive surfaces are occluded from the field of view, the lens being constructed according to the technical data given herebelow, the foci, radii and thicknesses being given in millimeters, wherein $R_1$, $R_2$, $R_3$ are radii of refractive surface curvatures, $t_1$ and $t_2$ are axial thicknesses of the front and rear lens elements respectively, $n_D(A)$ and $n_D(B)$ are the refractive indices for the D line of the spectrum for the A and B elements respectively, and $\nu_A$ and $\nu_B$ are the Abbe numbers for the A and B elements respectively, Equivalent focus = 100
Back focus = 68.47
$R_1$ = aspheric curve, shaped according to mathematical expression $$x = ay^2 + by^4 + cy^6 + dy^8 + ey^{10}$$

in which $x$ and $y$ are cartesian coordinates of the curve, the vertex radius R of the curve is $58 < R < 70$, and coefficient $a = +8.5559 \times 10^{-3}$ to $+7.000 \times 10^{-3}$ inclusive
coefficient $b = -7.7608 \times 10^{-7}$ to $-7.0216 \times 10^{-7}$ inclusive
coefficient $c = +1.4921 \times 10^{-10}$ to $+1.2711 \times 10^{-10}$ inclusive
coefficient $d = -3.5136 \times 10^{-14}$ to $-1.8920 \times 10^{-14}$ inclusive
coefficient $e = -2.8470 \times 10^{-17}$ to $-1.533 \times 10^{-17}$ inclusive
$R_2 = -52 < R_2 < -64$
$R_3 = 3.9 \times 10^2 < R_3 < 3.93 \times 10^5$
$t_1 = 29 < t_1 < 40$
$t_2 = 12.5 < t_2 < 16$ $$\frac{n_D(A)}{n_D(B)} = 1.091 \text{ to } 1.009$$

$\nu(A) - \nu(B) = 21.9$ to $25.9$

2. In an ophthalmic examination instrument, a projection lens by which light from an illuminated slit is focused upon the pupil of an eye to be examined and through which said eye may be examined by light rays that are reflected by the eye, said rays being focused at an image plane located rearwardly of said lens and slit, said lens being corrected for spherical and chromatic aberrations, sine condition and coma and comprising a front double convex element and a double concave element, the adjacent surfaces of the elements being cemented together, and an opaque mask having a diameter substantially .022 times the equivalent focal length of said lens, said mask being located centrally on the interface between the convex and concave elements so that the reflections of the illuminated slit that are reflected from the successive refractive surfaces are occluded from the field of view, the lens being constructed according to the constructional data given herebelow, the foci, radii and thicknesses being given in millimeters, wherein $R_1$, $R_2$, $R_3$ are radii of refractive surface curvatures, $t_1$, $t_2$ are axial thicknesses of the convex and concave elements, respectively, $n_D$ and $\nu$ are the refractive index for the D line of the spectrum and the Abbe number, respectively, Equivalent focus = 100
Back focus = 68.47
$R_1$ = an aspheric curve having a vertex radius R of 64.29 joined by a curve which is shaped according to the mathematical expression, $$x = ay^2 + by^4 + cy^6 + dy^8 + ey^{10}$$

in which $x$ and $y$ are cartesian coordinates and
coefficient $a = +8.5559 \times 10^{-3}$ to $+7.000 \times 10^{-3}$ inclusive
coefficient $b = -7.7608 \times 10^{-7}$ to $-7.0216$ inclusive
coefficient $c = +1.4921 \times 10^{-10}$ to $+1.2711 \times 10^{-10}$ inclusive
coefficient $d = -3.5136 \times 10^{-14}$ to $-1.8920 \times 10^{-14}$ inclusive coefficient $e = -2.847 \times 10^{-17}$ to $-1.533 \times 10^{-17}$ inclusive
$R_2 = -58.14$
$R_3 = 393.29$
$t_1 = 34.43$
$t_2 = 14.29$
$n_D = 1.6968$ for convex lens element
$n_D = 1.6725$ for concave lens element
$\nu = 56.1$ for convex lens element
$\nu = 32.2$ for concave lens element

References Cited in the file of this patent

UNITED STATES PATENTS

| | | |
|---|---|---|
| 52,672 | Boyle | Feb. 20, 1866 |
| 697,959 | Abbe | Apr. 22, 1902 |
| 880,208 | Germain et al. | Feb. 25, 1908 |
| 934,579 | Straubel et al. | Sept. 21, 1909 |
| 1,507,212 | Silberstein | Sept. 2, 1924 |
| 2,544,413 | Bouwers | Mar. 6, 1951 |